US 8,350,425 B2

(12) United States Patent
Green et al.

(10) Patent No.: US 8,350,425 B2
(45) Date of Patent: Jan. 8, 2013

(54) HOLDER FOR A POSITION SENSOR

(75) Inventors: Robert Andrew Green, Malmesbury (GB); Nicholas Timothy Spence, Malmesbury (GB); Yu Chen, Malmesbury (GB); Tuncay Celik, Malmesbury (GB)

(73) Assignee: Dyson Technology Limited, Malmesbury (GB)

( * ) Notice: Subject to any disclaimer, the term of this patent is extended or adjusted under 35 U.S.C. 154(b) by 283 days.

(21) Appl. No.: 12/709,253

(22) Filed: Feb. 19, 2010

(65) Prior Publication Data

US 2010/0225208 A1 Sep. 9, 2010

(30) Foreign Application Priority Data

Mar. 3, 2009 (GB) .................................. 0903586.6

(51) Int. Cl.
*G01B 21/00* (2006.01)
(52) U.S. Cl. ...................................... 310/68 B; 310/71
(58) Field of Classification Search ................. 310/68 E, 310/68 B, 71
See application file for complete search history.

(56) References Cited

U.S. PATENT DOCUMENTS

| | | | | |
|---|---|---|---|---|
| 4,336,471 A * | 6/1982 | Plancon | ...................... | 310/49.28 |
| 6,025,665 A | 2/2000 | Poag et al. | | |
| 6,819,019 B2 * | 11/2004 | Tamura et al. | .................. | 310/71 |
| 7,800,264 B2 * | 9/2010 | Dubuc et al. | ................. | 310/68 R |
| 2002/0158523 A1 * | 10/2002 | Abadia et al. | ............... | 310/68 B |
| 2009/0026859 A1 * | 1/2009 | Kinoshita et al. | ............... | 310/71 |

FOREIGN PATENT DOCUMENTS

| | | |
|---|---|---|
| DE | 41 28 419 | 3/1993 |
| DE | 10 2007 023 262 | 12/2007 |
| DE | 1862769 A2 * | 12/2007 |
| EP | 1 278 291 | 6/2004 |
| JP | 2-184239 | 7/1990 |
| JP | 8-308181 | 11/1996 |
| JP | 2002-257585 | 9/2002 |
| WO | WO-98/37618 | 8/1998 |

OTHER PUBLICATIONS

EPO website translation form German to English for EP 1862769, Hill, 6 pages.*
ISR and Written Opinion mailed Feb. 15, 2011 directed towards Application No. PCT/GB2010/050300; 10 pages.
British Search Report dated Jun. 18, 2009, directed to counterpart GB Application No. 0903586.6; 1 page.

* cited by examiner

*Primary Examiner* — Hanh Nguyen
*Assistant Examiner* — Naishadh Desai
(74) *Attorney, Agent, or Firm* — Morrison & Foerster LLP

(57) ABSTRACT

A holder for a position sensor of an electric machine. The holder includes a pocket for holding the position sensor, an abutment, and a biasing mechanism mountable to a fixture of the electric machine so as to bias the abutment relative to the fixture. Additionally, an electric machine that incorporates the holder, the electric machine including a stator against which the biasing mechanism biases the abutment.

20 Claims, 3 Drawing Sheets

HOLDER FOR A POSITION SENSOR

REFERENCE TO RELATED APPLICATIONS

This application claims the priority of United Kingdom Application No. 0903586.6, filed Mar. 3, 2009, the entire contents of which are incorporated herein by reference.

FIELD OF THE INVENTION

The present invention relates to a holder for a position sensor of an electric machine, and to an electric machine incorporating the same.

BACKGROUND OF THE INVENTION

The output power of an electric machine is critically dependant on accurate synchronisation of phase energisation and rotor position. The electric machine therefore requires mechanism for accurately determining the position of the rotor. A relatively cheap solution is a Hall-effect sensor.

Following manufacture and assembly of the electric machine, there is a tolerance in the position of the sensor relative to the stator and rotor. This tolerance in position results in an offset in the electrical angle of the signal output by the sensor. As a result, phase energisation and rotor position are not perfectly synchronised and thus the power and efficiency of the motor are reduced.

For many motors, the tolerance in the position of the sensor is not a problem. This may be because the size of the electric machine is relatively large and thus the tolerance in the position of the sensor is small in comparison to the circumference of the rotor. Consequently, any positional tolerance in the sensor results in a negligible offset in the electrical angle of the sensor signal. Alternatively, the output power and/or the efficiency of the electric machine are not critical and thus the power losses that arise from the positional tolerance of the sensor are deemed acceptable. However, for electric machines that are relatively small and/or where relatively high efficiency is required, tolerances in the position of the sensor present a significant problem.

SUMMARY OF THE INVENTION

In a first aspect, the present invention provides a holder for a position sensor of an electric machine, the holder comprising a pocket for holding the position sensor, an abutment, and a biasing mechanism mountable to a fixture of the electric machine for biasing the abutment relative to the fixture.

The holder may then be mounted within an electric machine such that the abutment is biased against a stator of the electric machine. In biasing the abutment against the stator, the position of the pocket relative to the stator is well defined. Accordingly, a position sensor held within the pocket may be accurately and reliably positioned relative to the stator. Synchronisation of phase energisation and rotor position is then improved resulting in a more powerful and efficient electric machine. Additionally, the sensor holder enables a Hall-effect sensor to be located accurately and reliably at a position where the effect of armature reaction is smallest.

Preferably, the biasing mechanism comprises one or more cantilever springs. More preferably, the biasing mechanism comprises a pair of cantilever springs arranged on opposite sides of the pocket. This then has the advantage that the cantilevers act to bias the abutment along both the x and y axes. The biasing mechanism is therefore better able to absorb tolerances in the electric machine to ensure that the pocket, and thus the position of the sensor held therein, are accurately aligned relative to the stator.

Each cantilever spring advantageously comprises an arcuate portion and an end portion that defines an eye of the spring. The eye of the spring may then be mounted over or around the fixture of the electric machine. The end portion preferably comprises a free end. This then enables the cantilever springs to be mounted to the fixture without stretching the arcuate arms. Any stretching of the arcuate arms reduces the resilience of the springs and ultimately leads to permanent set. The end portion of each arm is ideally taller than that of the arcuate portion. Accordingly, an additional component of the electric machine, such as a printed circuit board, may be mounted on top of the holder without impeding the movement of the arcuate portion of the springs.

The abutment may form part of the pocket. As a result, the inner surface of the pocket relative to the outer surface of the abutment is well defined. Consequently, when the abutment is biased against a stator of the electric machine, the position of the pocket relative to the stator is well defined.

The abutment may comprise a wall having a planar surface. This planar surface may then abut a side of a stator, and in particular a pole of the stator. This then has the advantage that, in addition to controlling the position of the pocket relative to the stator, the abutment controls the orientation or tilt of the pocket relative to the stator. The wall of the abutment may define a wall of the pocket. Consequently, when the wall is biased against the stator, the tolerance in the position and orientation of the pocket relative to the stator is tightly controlled and is effectively limited to the tolerance in the thickness of the wall.

Advantageously, the wall of the abutment comprises one or more ridges. The wall and each ridge then define a corner that is free to engage with a corner of the stator of the electric machine, e.g. such as the corner of a pole of the stator. As a result, the position of the pocket relative to the stator may be fixed along both the x and y axes.

The pocket preferably comprises a front wall and a rear wall resiliently connected to the front wall. Accordingly, a position sensor held within the pocket is biased against the front wall. This then reduces the tolerances in the position and orientation of the sensor relative to the pocket, and thus further minimises the tolerances in the position and orientation of the sensor relative to the stator.

The holder is preferably formed of plastic. Not only is the holder then cheaper to manufacture, but the holder is neither subject to inductive heating nor does it present a short to the magnetic circuit.

In a second aspect, the present invention provides an electric machine comprising a stator, a position sensor and a sensor holder, the sensor holder comprising a pocket in which the position sensor is held, an abutment, and a biasing mechanism biasing the abutment against the stator.

In biasing the abutment against the stator, the position and/or orientation of the pocket relative to the stator is well controlled. Accordingly, the position sensor held within the pocket is accurately aligned relative to the stator. Synchronisation of phase energisation and rotor position is then improved resulting in a more powerful and efficient electric machine. Moreover, if the position sensor is a Hall-effect sensor, the sensor can be accurately located at a position relative to the stator at which the effect of armature reaction is at a minimum In biasing the abutment against the stator, the biasing mechanism acts to absorb tolerances in the electric machine. Accordingly, the position sensor is aligned relative to the stator with much greater accuracy than would be possible with a comparable fixed sensor holder.

Preferably, the abutment is biased against a pole of the stator. Accordingly, the position sensor may be accurately aligned with respect to a pole of the stator. A rotor of the electric machine rotates relative to the poles of the stator. By accurately aligning the position sensor relative to a pole of the stator, accurate alignment relative to the rotor may also be achieved.

More preferably, the abutment comprises a wall having a ridge, and the wall abuts a side of a pole of the stator and the ridge abuts a face of the pole. Accordingly, the position sensor is accurately positioned relative to a slot opening in the stator. The position sensor typically senses the position of a rotor of the electric machine via the slot opening. By accurately aligning the position sensor relative to a slot opening in the stator, accurate alignment relative to the rotor may also be achieved. Indeed, the wall of the abutment advantageously comprises a pair of ridges, and the biasing mechanism biases the ridges within the slot opening. Accordingly, regardless of the direction along the x-axis in which the biasing mechanism biases the abutment, a ridge is nevertheless biased against the face of a pole. The ridges are ideally separated by a distance substantially corresponding to the width of the slot opening. Accordingly, movement of the abutment along the x axis is tightly controlled.

The biasing mechanism may be mounted to a housing of the electric machine. Moreover, the housing may comprise a pair of posts to which the biasing mechanism is mounted. The stator may also be mounted to the same posts (e.g. the stator may include recesses into which the posts are received). Since the stator and sensor holder and mounted to the same fixture, namely the posts, geometric tolerances associated with the alignment of the sensor holder and stator are reduced. The electric machine may also comprise a printed circuit board that overlies the stator and sensor holder and is screwed to the posts of the housing so as to secure the stator, sensor holder and printed circuit board to the housing. This particular arrangement then has the advantage of providing a compact design of electric machine.

The position sensor is preferably a Hall-effect sensor. Accordingly, a relatively cheap solution is provided for sensing the position of a permanent-magnet rotor.

The electric machine may be relatively small and comprise a rotor having a diameter of no more than 50 mm. The electric machine is therefore compact but is nevertheless capable of relatively good efficiency by virtue of the sensor holder, which ensures that the position sensor is accurately aligned relative to the rotor.

BRIEF DESCRIPTION OF THE DRAWINGS

In order that the present invention may be more readily understood, embodiments of the invention will now be described, by way of example, with reference to the accompanying drawings, in which.

DETAILED DESCRIPTION OF THE INVENTION

Figure 1:
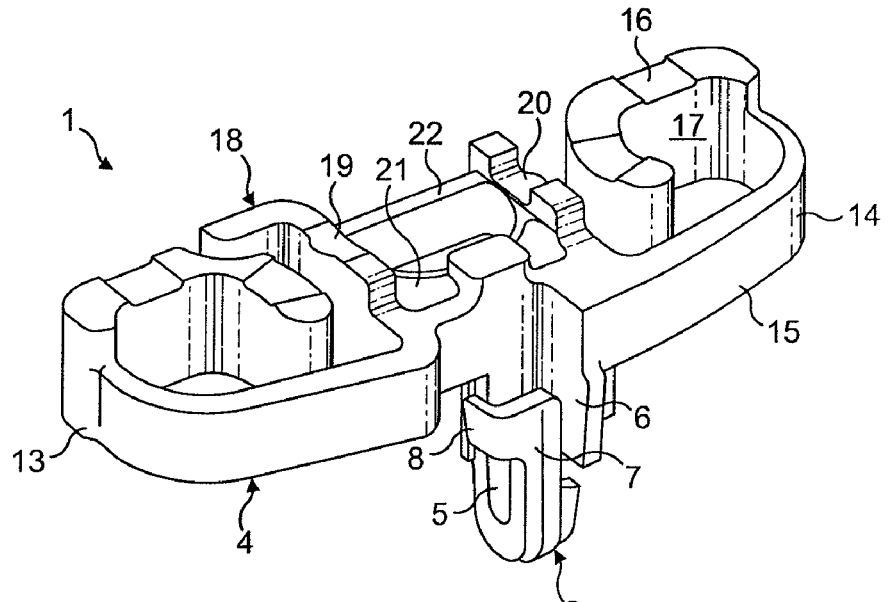
FIG. 1 is a first view of a sensor holder in accordance with the present invention.
Figure 2:
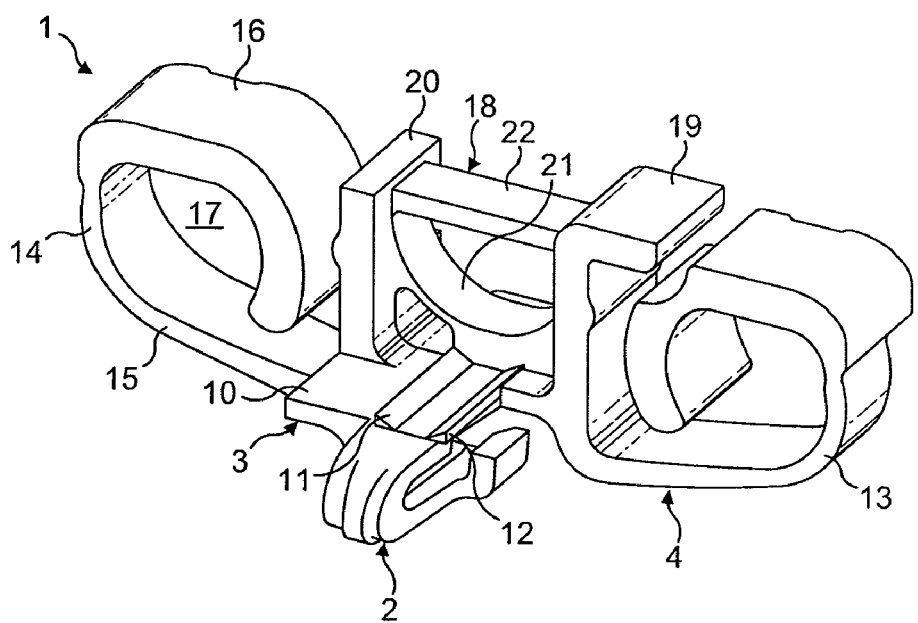
FIG. 2 is a second view of the sensor holder of FIG. 1.

The sensor holder 1 of FIG. 1 comprises a pocket 2, an abutment 3 and a biasing mechanism 4.

The pocket 2 defines a recess into which a position sensor may be held. The pocket 2 comprises a front wall 5 connected to a first side wall 6, and a rear wall 7 connected to a second side wall 8. The rear wall 7 is resiliently connected to the front wall 5 at a base. The rear and second side walls 6,7 are thus able to move resiliently relative to the front and first side walls 5,6. In having a pair of resilient walls 6,7, a position sensor is held tightly within the pocket 2. Moreover, the position sensor is held firmly against the front wall 5 of the pocket. Consequently, not only the position but also the orientation of the position sensor is aligned within the pocket 5.

The abutment 3 comprises a wall 10 having a planar outer surface on which a pair of ridges 11,12 is formed. The wall 10 of the abutment 2 forms part of the pocket 2. In particular, the wall 10 forms part of the front wall 5 of the pocket 2. As a result, the inner surface of the front wall 5 relative to the outer planar surface of the abutment wall 10 is well defined. Indeed, any difference between the inner and outer surfaces results solely from a tolerance in the thickness of the wall 10. Although the wall 10 of the abutment 3 defines the front wall 5 of the pocket 2, the inner and outer surfaces of the wall 5,10 are not necessarily parallel, i.e. the inner surface of the front wall 5 need not be parallel to the outer surface of the abutment 3. Indeed, as described below, in order to minimise the effects of armature reaction, it may be advantageous to tilt the inner surface of the front wall 5 relative to the planar surface of the abutment wall 10.

The biasing mechanism 4 comprises a pair of cantilever springs 13,14 arranged on opposite sides of the pocket 2. Each cantilever spring 13,14 comprises an arcuate portion 15 and an end portion 16. The end portion 16 is curled so as to define an eye 17 of the spring 13,14. The end portion 16 is thicker and taller than the arcuate portion 15, the advantages of which are set out below.

The biasing mechanism 4 additionally includes a support frame 18 formed at the back of the cantilever springs 13,14. The support frame 18 comprises a pair of walls 19,20, each extending from an end of a cantilever spring 13,14 adjacent the pocket 2, an arch 21 and a strut 22 extending between the two walls 19,20. The support frame 18 helps prevent twisting of the pocket 2 relative to the abutment 3. Additionally, the two cantilever springs 13,14 may be regarded as forming a single leaf spring. The support frame 18 then serves to increases the stiffness of this leaf spring.

The cantilever springs 13,14 flex within an x-y plane, and the pocket 2 and abutment 3 extend downwardly from (i.e. in a direction normal to) this plane.

The sensor holder 1 is intended to be mounted to a fixture or the like of an electric machine. The sensor holder 1 is mounted to the fixture by the biasing mechanism 4, which then act of bias the abutment 3 relative to the fixture.

Figure 3:
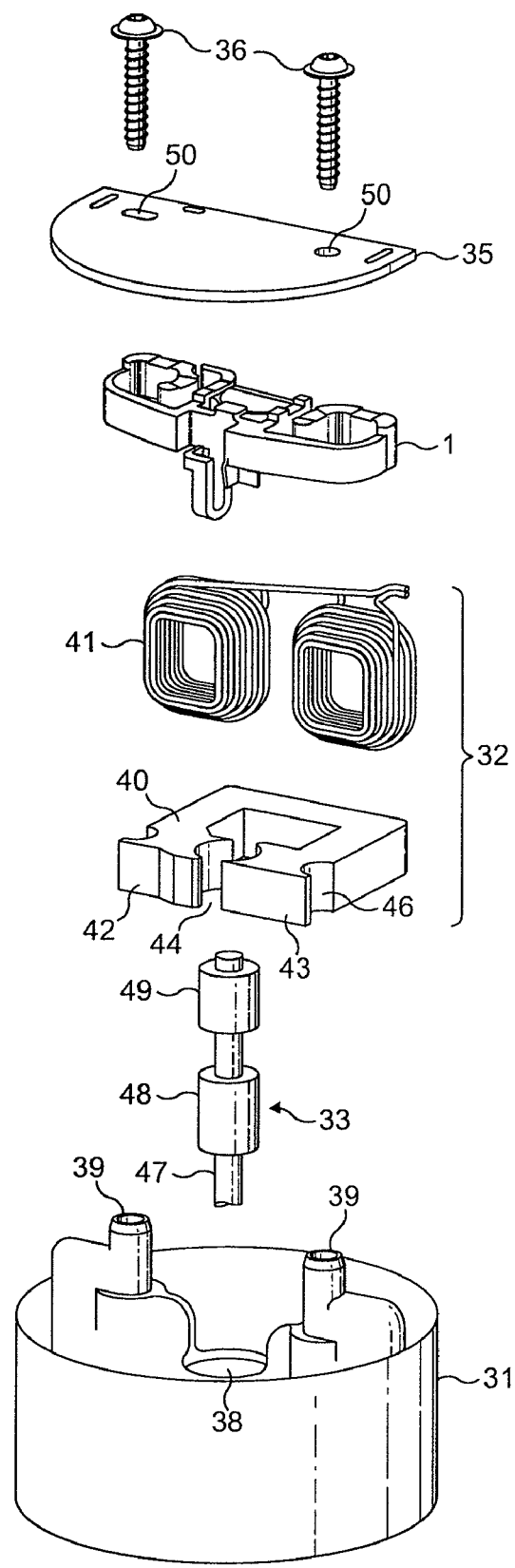
FIG. 3 is an exploded view of an electric machine in accordance with the present invention.

FIG. 3 illustrate an electric machine 30 that incorporates the sensor holder 1. In addition to the sensor holder 1, the electric machine 30 comprises a housing 31, a stator 32, a rotor 33, a position sensor 34, a printed circuit board (PCB) 35, and a pair of non-magnetic screws 36.

The housing 31 comprises a base 37 through which a central bore 38 is formed, and a pair of hollow posts 39 upstanding from the base 37.

Figure 4:
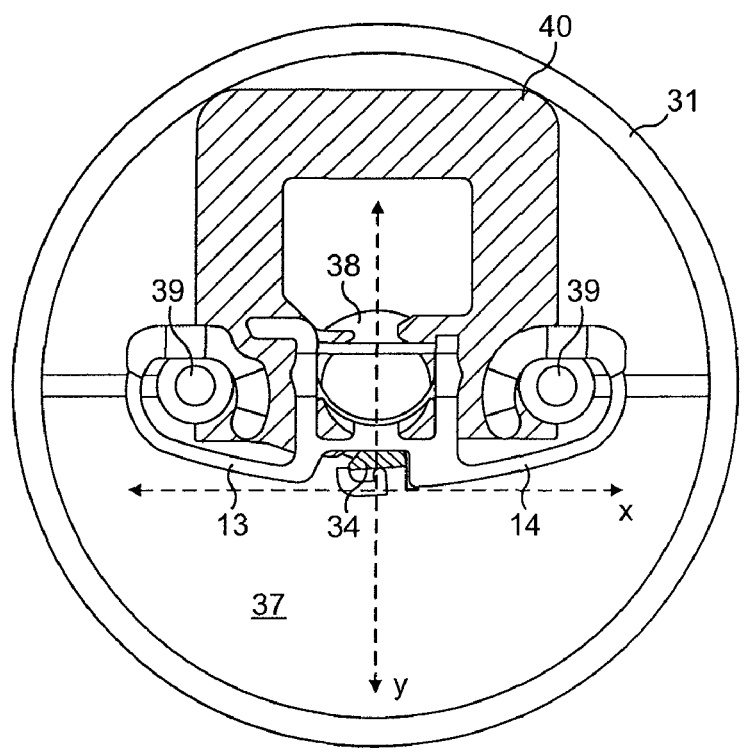
FIG. 4 is a plan view of the housing, stator core and sensor holder of the electric machine of FIG. 3.

The stator 32 comprises a stator core 40 and a winding 41 wound about the stator core 40. The stator core 40 is c-shaped and comprises a pair of poles 42,43 separated by a slot opening 44. Each pole 42,43 comprises a pole face 45 adjacent the slot opening 44. The stator core 40 further comprises a pair of mounting recesses 46 formed on opposite sides of the stator core 40. The stator 32 is mounted to the housing 31 such that each post 39 is received within a mounting recess 46 of the stator core 40. The posts 39 act to prevent movement of the stator core 40 in the x-y plane (as illustrated in FIG. 4).

The rotor 33 comprises a shaft 47 to which are mounted a bearing assembly 48 and a permanent-magnet rotor core 49. The rotor 33 is mounted to the housing 31 by mechanism of the bearing assembly 48, which is secured within the bore 38 of the housing 31. The rotor 33 is secured to the housing 31 such that the rotor core 49 is located between the two poles 42,43 of the stator 32.

The position sensor 34 is a Hall-effect sensor that generates a potential difference or Hall voltage in response to a magnetic field perpendicular to the plane of the sensor 34. The position sensor 34 is held within the pocket 2 of the sensor holder 1 such that plane of the sensor 34 is aligned parallel to the front wall 5 of the pocket 2.

The sensor holder 1 is mounted to the housing 31 at a position above the stator 32. Each post 39 of the housing 31 is received within an eye 17 of a cantilever spring 13,14. Each eye 17 is bigger than that of a respective post 39. Consequently, the sensor holder 39 is free to move relative to the posts 39 by a small amount in the x-y plane.

The sensor holder 1 is mounted to the posts 39 such that the pocket 2 and the abutment 3 project downwardly towards the stator 32. As described in further detail below, the biasing mechanism 4 act to bias the abutment 3 against the stator 32 such that the position and orientation of the pocket 2, and thus the position sensor 34 held therein, are accurately aligned relative to the stator 32.

The PCB 35 is electrically coupled to the winding 41 of the stator 32 and to the position sensor 34. In response to the signal of the position sensor 34, the PCB controls phase energisation of the winding 41. The PCB includes a pair of through-holes 50 and overlies the stator 32 and the sensor holder 1 such that each of the through-holes 50 is aligned with a respective post 39 of the housing 31. The PCB 35 is then screwed to the posts 39 by the pair of non-magnetic screws 36 so as to secure the PCB 35, sensor holder 1 and stator 32 to the housing 31.

As noted above, the end portion 16 of each cantilever spring 13,14 is taller and thicker than the arcuate portion 15. As a consequence of being taller, the PCB 35 contacts only the end portion 16 of each cantilever spring 13,14. The PCB 35 does not therefore contact or impede the arcuate portion 15 of each cantilever spring 13,14. As a consequence of being thicker, the end portion 16 of each spring 13,14 is better able to withstand the compression forces between the PCB 35 and the stator 32. The support frame 18 of the sensor holder 1 is equally as tall as the end portions 16 and provide additional support against the compression forces acting between the PCB 35 and the stator 32.

The housing 31 and the sensor holder 1 are each made of plastic. This then has the advantage that neither the housing 31 nor the sensor holder 1 are subjected to inductive heating or present a partial short to the magnetic circuit.

Returning now to the sensor holder 1, FIG. 4 illustrates the sensor holder 1 mounted on top of the stator 32, both of which are mounted to the posts 39 of the housing 31. The cantilever springs 13,14 bias the abutment 3 against the stator core 40.

The cantilever springs 13,14 act to bias the abutment 3 along both the x-axis and the y-axis. The end portion 16 of each cantilever spring 13,14 has a free end, and thus the eye 17 of each spring 13,14 is open. Consequently, on mounting the cantilever springs 13,14 to the posts 39 of the housing 31, the end portion 16 of each spring 13,14 moves to accommodate the posts 39. The cantilever spring 13,14 are therefore mounted to the posts 39 without any stretching of the arcuate arms 15 occurring along the x-axis. Any stretching of the arcuate arms 15 would reduce the resilience of the springs 13,14 and might ultimately lead to permanent set.

Figure 5:
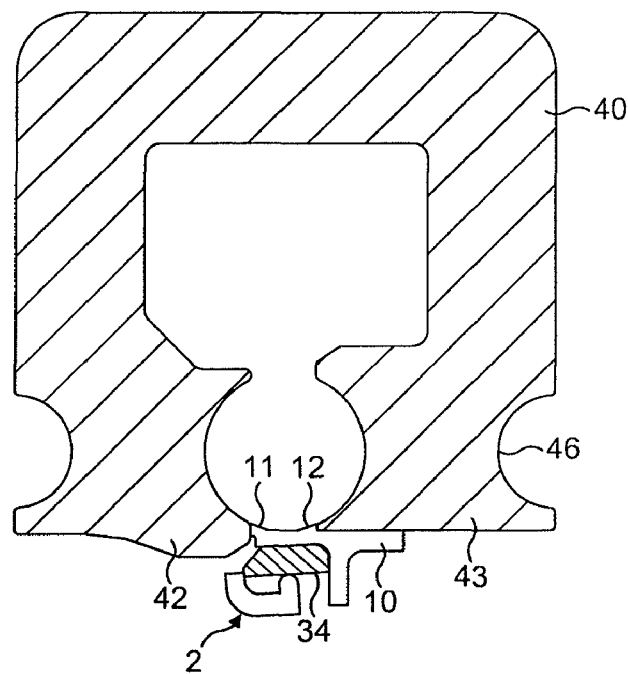
FIG. 5 is a sectional view of the stator core, position sensor and sensor holder of the electric machine of FIGS. 3 and 4.

Referring now to FIG. 5, the cantilever springs 13,14 bias the planar surface of the wall 10 of the abutment 3 against the side of a pole 43 of the stator core 40. This then fixes the position of the abutment 3 relative to the stator 32 along the y-axis. The planar surface also fixes the orientation or tilt of the abutment 3 relative to the stator 32. Furthermore, the wall 10 presents a relatively large surface over which the biasing force of the cantilever springs 13,14 is distributed.

The cantilever springs 13,14 also bias one of the ridges 11,12 of the abutment 3 against the face 45 of the one of the poles 42,43. This then fixes the position of the abutment 3 relative to the stator 32 along the x-axis. The two ridges 11,12 of the abutment 3 are spaced apart by a distance that corresponds substantially to the width of the slot opening 44 in the stator core 40. In biasing the abutment 3, the cantilever springs 13,14 pull the ridges 11,12 into the slot opening 44 in the stator core 40. While the spacing of the ridges 11,12 ideally corresponds to the width of the slot opening 44, there are tolerances associated with the spacing of the two ridges 11,12 as well as with the width of the slot opening 44. As a result, the spacing of the ridges 11,12 is slightly smaller than that of the slot opening 44. Nevertheless, the difference is relatively small and does not adversely affect the alignment of the position sensor 34 relative to the stator 32.

If only one ridge 11 were provided, it might be possible for the ridge 11 to be pulled off the face 45 of the pole 42,43 by the cantilever springs 13,14. As a result, the position of the abutment 3 would not be fixed relative to the stator 32 along the x-axis. By having a pair of ridges 11,12 that are biased into the slot opening 44, at least one of the ridges 11,12 is biased against a pole face 45 and thus the position of the abutment 3 is fixed along the x-axis.

The cantilever springs 13,14 thus act to bias the abutment 3 against the stator core 40 such that the position and orientation of the abutment 3 relative to the stator 32 is accurately defined. The pocket 2 of the sensor holder 1 is fixed relative to the abutment 3. Moreover, the inner surface of the front wall 5 of the pocket 2 is well defined relative to the outer planar surface of the wall 10 of the abutment 3. Consequently, the pocket 2, and thus position sensor 34 held therein, are also accurately aligned relative to the stator 32. The sensor holder 1 therefore ensures that the position sensor 34 is accurately positioned and oriented relative to the stator 32 and in particular the slot opening 44 of the stator 32.

The rotor 33 of the electric machine 30 rotates relative to the poles 42,43 of the stator core 40. By accurately aligning the position sensor 34 relative to a pole 43 of the stator core 40, accurate alignment of the position sensor 34 relative to the rotor 33 is also achieved. Moreover, the position sensor 34 senses the position of the rotor 33 via magnetic flux passing through the slot opening 44. By accurately aligning the position sensor 34 relative to the slot opening 44, alignment of the position sensor 34 relative to the rotor 33 is improved.

In biasing the abutment 3 along both the x and y axes, the biasing mechanism 4 of the sensor holder 1 acts to absorb tolerances in the electric machine 30. For example, there are tolerances associated with the position of the posts 39 of the housing 31, the location of the mounting recesses 46 relative to the slot opening 44 in the stator, as well as the dimensions of the sensor holder 1. If a fixed sensor holder were secured to the posts 39 of the housing 31, tolerances in the components of the electric machine 30 would mean that the position sensor 34 would not be accurately aligned relative to the stator 32 and rotor 33. In contrast, the biasing mechanism 4 of the sensor holder 1 of the present invention acts to absorb tolerances in the electric machine 30, thereby ensuring that the position sensor 34 is aligned relative to the stator 32 and rotor 33 with much greater accuracy.

Since the sensor holder 1 ensures that the position sensor 34 is accurately aligned relative to the stator 32, and in particular the slot opening 44, better synchronisation is achieved between phase energisation and rotor position. In particular, any offset in the electrical angle of the signal output by the position sensor 34 as a result of sensor misalignment is significantly reduced. As a result, a more powerful and efficient electric machine 30 is achieved.

Accurate alignment of the position sensor 34 relative to the stator 32 is particularly important for relatively small electric machines (i.e. electric machines having a rotor of diameter less than 50 mm). Any misalignment of the position sensor 34 results in a relatively large offset in the electrical angle of the sensor signal. This relatively large offset in electrical angle significantly reduces the power and/or the efficiency of the electric machine. The sensor holder 1 of the present invention, in accurately and reliably aligning the position sensor 34, enables a small, powerful and efficient electric machine to be achieved.

For many electric machines, the loss in output power arising from the misalignment of position sensor is simply compensated by increasing the input power. However, this then reduces the overall efficiency of the electric machine. Efficiency is particularly important for electric machines that are battery-powered, where battery life is linked to efficiency. With the sensor holder 1 of the present invention, better synchronisation between the phase energisation and rotor position is achieved. Accordingly, losses in output power are significantly reduced and the efficiency of the electric machine 30 is increased. The sensor holder 1 is therefore ideally suited for use in electric machines where relatively high efficiency is required, e.g. battery-operated electric machines.

Owing to the effect of armature reaction, a Hall-effect sensor is sensitive to both the rotor field and the armature field (i.e. the field generated by the current in the winding 41 of the stator 32). The armature field is dynamic and varies with the current in the winding 41. The effect of armature reaction therefore results in an offset in electrical angle of the sensor signal that varies with the current in the winding 41. This makes accurate synchronisation of phase energisation with rotor position difficult. In order to minimise the effects of armature reaction, the Hall-effect sensor 34 is located at a position relative to the stator 32 at which the effect of armature reaction is smallest. The sensor holder 1 then ensures that, once the location of minimum armature effect has been identified, the Hall-effect sensor 34 can be accurately and reliably aligned relative to the stator 32 so as to minimise armature effect. In minimising armature effect, the offset in electrical angle due to changes in current in the winding 41 are minimised and a more powerful and efficient electric machine 30 is achieved.

The effect of armature reaction is particular important for battery-operated electric machines, where the current in the winding 41 decreases as the battery discharges. Since the sensor holder 1 ensures that the Hall-effect sensor 34 is located at a position of minimum armature effect, the electric machine is able to maintain relatively accurate synchronisation of phase energisation and rotor position as the battery discharges. Consequently, the electric machine is able to maintain good efficiency.

The position at which the effect of armature reaction is at a minimum may require that that the Hall-effect sensor 34 is tilted relative to the stator 32. Accordingly, the inner surface of the front wall 5 of the pocket 2 may be tilted relative to the planar wall 10 of the abutment 3. Consequently, the sensor holder 1 ensures that not only the position but also the orientation of the Hall-effect sensor 34 is accurately aligned relative to the stator 32.

In the above-described embodiment, the biasing mechanism 4 comprises a pair of cantilever springs 13,14 that act to bias the abutment against the stator 32. However, alternative mechanisms for biasing the abutment 3 against the stator 32 may be used. For example, the biasing mechanism 4 might comprise a single cantilever spring, which unlike the embodiment described above, is fixedly secured at one end to the housing 31. The pocket 2 and abutment 3 would then be located at the free end of the cantilever spring. Alternatively, the biasing mechanism 4 might comprise a leaf spring. Indeed, the two cantilever springs 13,14 of the embodiment described above may be regarded as two arms of a single leaf spring. It is only by virtue of the position of the pocket 2 that the biasing mechanism 4 of the above-described embodiment is best thought of as two cantilever springs 13,14 rather than a single leaf spring. However, the pocket 2 might be located at the front or rear of a continuous leaf spring.

In the electric machine 30 described above, the sensor holder 1 is mounted to a pair of posts 39 forming part of the housing 31. Moreover, the stator 32 and the PCB 35 are mounted to the same pair of posts 39. However, the sensor holder 1 might equally be mounted to a different fixture within the electric machine 30. For example, the sensor holder 1 might be mounted to a different pair of posts to that of the stator 32 and the PCB 35. Moreover, rather than being mounted to the housing 31, the sensor holder 1 might be mounted to a different component of the electric machine 31. By way of example only, the winding 41 of the stator 32 may be wound onto a bobbin and the sensor holder 1 may be mounted to the bobbin.

The sensor holder 1 described above comprises a pair of resilient walls 6,7 that bias the position sensor 34 against the front wall 5 of the pocket 2. The resilient walls 6,7 have the advantage of mopping up any tolerances in the pocket 2 of the sensor holder 1 so as to ensure that the position sensor 34 is tightly held against the front wall 5 of the pocket 2. However, a pocket 2 having fixed walls may equally be used. While there will then be a tolerance associated with the position and orientation of the position sensor 34 relative to the front wall 5 of the pocket 2, this tolerance may be within acceptable limits.

The position sensor 34 described above is a Hall-effect sensor. However, the sensor holder 1 might equally be used to hold an alternative type of position sensor 34, where accurate alignment of the position sensor relative to the stator 32 is required. For example, the position sensor 34 might comprise an optical sensor.

In the embodiment described above, the abutment 3 comprises a wall 10 on which a pair of ridges 11,12 is formed. However, the form of the abutment 3 is not limited and may take alternative forms. By way of example only, the abutment 3 may comprise a single protrusion that engages with a recess or other feature of the stator core 40 to fix the position of the sensor holder 1 relative to the stator 32.

With the sensor holder of the present invention, a position sensor may be more accurately aligned relative to a stator and rotor of an electric machine. Accordingly, better synchronisation may be achieved between phase energisation and rotor position, resulting in a more powerful and efficient electric machine.

The invention claimed is:

1. A holder for a position sensor of an electric machine, the holder comprising a pocket for holding the position sensor, an abutment, and a biasing mechanism mountable to a fixture of the electric machine for biasing the abutment relative to the fixture, wherein the biasing mechanism comprises one or more cantilever springs.

2. A holder as claimed in claim 1, wherein the biasing mechanism comprises a pair of cantilever springs arranged on opposite sides of the pocket.

3. A holder as claimed in claim 1, wherein each cantilever spring comprises an arcuate portion and an end portion that defines an eye of the spring.

4. A holder as claimed in claim 3, wherein the end portion of each spring comprises a free end.

5. A holder as claimed in claim 3, wherein the end portion of each spring is taller than that of the arcuate portion.

6. A holder as claimed in claim 1, wherein the abutment forms part of the pocket.

7. A holder as claimed in claim 1, wherein the abutment comprises a wall having a planar surface.

8. A holder as claimed in claim 7, wherein the wall comprises one or more ridges.

9. A holder as claimed in claim 1, wherein the pocket comprises a front wall and a rear wall resiliently connected to the front wall.

10. An electric machine comprising a stator, a position sensor, and a sensor holder, the sensor holder comprising a pocket in which the position sensor is held, an abutment, and a biasing mechanism biasing the abutment against the stator, wherein the biasing mechanism comprises one or more cantilever springs.

11. An electric machine as claimed in claim 10, wherein the abutment is biased against a pole of the stator.

12. An electric machine as claimed in claim 10, wherein the abutment comprises a wall having a ridge, and the wall is biased against a side of a pole of the stator and the ridge is biased against a face of the pole.

13. An electric machine as claimed in claim 12, wherein the stator has a slot opening between adjacent poles, the wall has a pair of ridges, and the biasing mechanism biases the ridges within the slot opening.

14. An electric machine as claimed in 13, wherein the ridges are separated by a distance substantially corresponding to the width of the slot opening.

15. An electric machine as claimed in claim 10, wherein the electric machine comprises a housing having a pair of posts, and the biasing mechanism is mounted to the posts.

16. An electric machine as claimed in claim 15, wherein the stator is mounted to the posts.

17. An electric machine as claimed in claim 16, wherein the electric machine comprises a printed circuit board that overlies the stator and the sensor holder and is screwed to the posts of the housing.

18. An electric machine comprising a housing having a pair of posts, a stator, a position sensor, and a sensor holder, the sensor holder comprising a pocket in which the position sensor is held, an abutment, and a biasing mechanism biasing the abutment against the stator, wherein the biasing mechanism comprises one or more cantilever springs, each cantilever spring comprises an arcuate portion and an end portion that defines an eye in the spring, and each post is received within the eye of a respective spring.

19. An electric machine as claimed in claim 18, wherein the end portion of each spring is taller than that of the arcuate portion, and the electric machine comprises a printed circuit board that overlies the sensor holder and abuts the end portion of each spring.

20. An electric machine comprising a stator, a position sensor, and a sensor holder, the sensor holder comprising a pocket in which the position sensor is held, an abutment, and a biasing mechanism biasing the abutment against a pole of the stator, wherein the abutment comprises a wall having a ridge, and the wall is biased against a side of a pole of the stator and the ridge is biased against a face of the pole.

\* \* \* \* \*